United States Patent
Song

(10) Patent No.: US 11,677,590 B2
(45) Date of Patent: Jun. 13, 2023

(54) METHOD AND APPARATUS FOR DISTRIBUTED COMMUNICATION BASED ON RECEPTION SIGNAL QUANTIZATION IN WIRELESS COMMUNICATION SYSTEM

(71) Applicants: ELECTRONICS AND TELECOMMUNICATIONS RESEARCH INSTITUTE, Daejeon (KR); UNIVERSITY OF ULSAN FOUNDATION FOR INDUSTRY COOPERATION, Ulsan (KR)

(72) Inventor: Jiho Song, Ulsan (KR)

(73) Assignees: Electronics and Telecommunications Research Institute, Daejeon (KR); University of Ulsan Foundation for Industry Cooperation, Ulsan (KR)

( * ) Notice: Subject to any disclaimer, the term of this patent is extended or adjusted under 35 U.S.C. 154(b) by 0 days.

(21) Appl. No.: 17/475,143

(22) Filed: Sep. 14, 2021

(65) Prior Publication Data

US 2022/0086027 A1  Mar. 17, 2022

(30) Foreign Application Priority Data

Sep. 15, 2020 (KR) .................. 10-2020-0118547
Sep. 14, 2021 (KR) .................. 10-2021-0122701

(51) Int. Cl.
*H04L 25/02* (2006.01)
*H04B 7/0452* (2017.01)

(52) U.S. Cl.
CPC ....... *H04L 25/0242* (2013.01); *H04B 7/0452* (2013.01); *H04L 25/0252* (2013.01)

(58) Field of Classification Search
CPC ............ H04L 25/0242; H04L 25/0252; H04L 25/0248; H04L 25/0391; H04L 25/0202; H04B 7/0452; H04B 7/0456
See application file for complete search history.

(56) References Cited

U.S. PATENT DOCUMENTS

| | | | |
|---|---|---|---|
| 8,331,481 B2 | 12/2012 | Lee et al. |
| 8,503,516 B2 | 8/2013 | Park et al. |
| 9,716,538 B2 | 7/2017 | Shim et al. |
| 9,801,192 B2 | 10/2017 | Kim et al. |

(Continued)

OTHER PUBLICATIONS

D. Richard Brown III et al., "Distributed Reception with Hard Decision Exchanges", IEEE Transactions On Wireless Communications, vol. 13, No. 6, Jun. 2014, pp. 3406-3418.

(Continued)

*Primary Examiner* — Vineeta S Panwalkar
(74) *Attorney, Agent, or Firm* — Rabin & Berdo, P.C.

(57) ABSTRACT

An operation method of a first receiving node in a distributed communication system may comprise: receiving a signal from a transmitting node; extracting a combined signal vector from a reception signal vector corresponding to a vector of the received signal; obtaining a compressed combined signal vector by extracting a preset number T of combined signal elements from among a plurality of combined signal elements constituting the combined signal vector; quantizing the compressed combined signal vector to obtain a quantized combined signal vector; and transmitting the quantized combined signal vector to a second receiving node included in the distributed communication system.

15 Claims, 6 Drawing Sheets

(56) References Cited

U.S. PATENT DOCUMENTS

| | | | |
|---|---|---|---|
| 10,237,023 B2 | 3/2019 | Lim et al. | |
| 10,869,297 B2 | 12/2020 | Seo | |
| 2009/0252249 A1 | 10/2009 | Kim et al. | |
| 2017/0353742 A1* | 12/2017 | Albrecht | G06F 3/165 |
| 2021/0075456 A1* | 3/2021 | Orhan | H03M 7/30 |

OTHER PUBLICATIONS

Jumil Choi et al., "Coded Distributed Diversity: A Novel Distributed Reception Technique for Wireless Communication Systems", ArXiv:1403.7679v1 [cs.IT], Mar. 29, 2014, pp. 1-11.

Jumil Choi et al., "Near Maximum-Likelihood Detector and Channel Estimator for Uplink Multiuser Massive MIMO Systems With One-Bit ADCs", IEEE Transactions On Communications, vol. 64, No. 5, May 2016, pp. 2005-2018.

Jumil Choi et al., "Quantized Distributed Reception for MIMO Wireless Systems Using Spatial Multiplexing", IEEE Transactions On Signal Processing, vol. 63, No. 13, Jul. 1, 2015, pp. 3537-3548.

\* cited by examiner

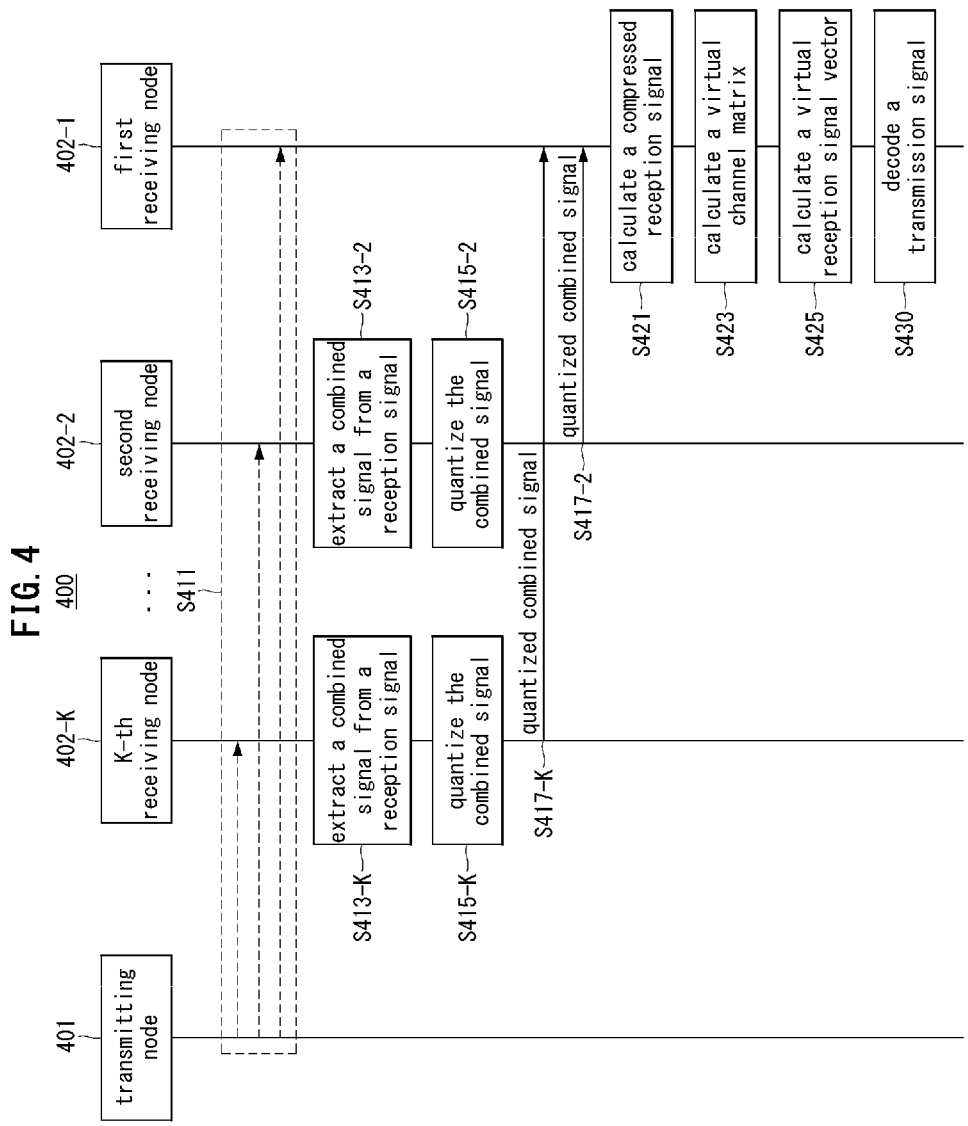

FIG. 5

| Algorithm 1 signal quantization based distributed reception system |
|---|

S510 — Step1) reception signal compression and quantization
S511 — 1: All users receive a transmission signal
$$y^k = \sqrt{PNM}U^k B^k x^k + n^k$$
S513 — 2: AU compresses a reception signal and extracts a combined signal
$$\frac{(\tilde{B}^k)^{-1}(\tilde{U}^k)^H y^k}{\sqrt{PNM}} = \tilde{x}^k + \tilde{n}^k$$
S515 — 3: AU quantizes amplitude and phase information of the combined signal
$$\hat{x}^k = \tilde{x}^k + \tilde{e}^k + \tilde{n}^k$$
S517 — 4: AU transmits the quantized combined signal to MU
S520 — Step2) transmission signal-reception signal relational expression
S521 — 5: MU calculates a compressed reception signal of AU by using the quantized combined signal received from AU
$$\hat{y}^k = \sqrt{PNM}\tilde{U}^k \tilde{B}^k \hat{x}^k = \sqrt{P}\tilde{H}^k s + \tilde{e}_{\text{eff}}^k + \tilde{n}_{\text{eff}}^k$$
S523 — 6: MU defines a virtual channel matrix in consideration of the entire network
$$\bar{H} = [(H^1)^H, (\tilde{H}^2)^H, \cdots, (\tilde{H}^K)^H]^H$$
S525 — 7: MU defines a virtual reception signal vector in consideration of the entire network
$$\bar{y} = [(y^1)^H, (\hat{y}^2)^H, \cdots, (\hat{y}^K)^H]^H$$
S530 — Step3) transmission signal decoding
S531 — 8: MU calculates a covariance matrix in consideration of a quantization error and noise signal
$$C_{\bar{q}} = \begin{bmatrix} C^N & 0 & 0 & 0 \\ 0 & C_{\text{eff}}^{\text{QEN}} & 0 & 0 \\ 0 & 0 & \ddots & 0 \\ 0 & 0 & 0 & C_{\text{eff}}^{\text{QEN}} \end{bmatrix},$$
$$C^N = \rho^{-1}I_N,$$
$$C_{\text{eff}}^{\text{QEN}} = \left(PM \sum_{t=1}^{T} \Omega(B_t^p, B_t^a)|\beta_t|^2 + T(\rho N)^{-1}\right)I_N$$
S533 — 9: MU designs an MMSE signal decoding apparatus by using the covariance matrix, and decodes the transmission signal by using the same.
$$\hat{s} = \frac{1}{\sqrt{P}}(\bar{H}^H C_{\bar{q}}^{-1} \bar{H} + MP^{-1}I_M)^{-1}\bar{H}^H C_{\bar{q}}^{-1}\bar{y}.$$

FIG. 6

| | |
|---|---|
| Algorithm 2 quantization resource allocation optimization | |
| S610 — Initialization | |
| S611 — 1: initialize a quantization resource allocation scenario $\check{\mathcal{R}}_{\check{T}} = \{\check{B}_1^p, \check{B}_1^a, \cdots, \check{B}_{\check{T}}^p, \check{B}_{\check{T}}^a\} = \{1,1,\cdots,1,1\}$ | |
| S620 — Iterative update of quantization resource allocation scenario | |
| S621 — 2: While $\sum_{t=1}^{\check{T}} (\check{B}_t^p + \check{B}_t^a) < B$ | |
| S623 — 3: calculate a gradient function of an objective function in the quantization resource allocation scenario $\check{\mathcal{R}}_{\check{T}}$ $\nabla_{\check{\mathcal{R}}_{\check{T}}} ( \sum_{t=1}^{\check{T}} \Omega(\check{B}_t^p, \check{B}_t^a) E[|\beta_t|^2] )$ | |
| S625 — 4: select a combined signal element having a minimum value among 2T partial derivate functions $(\hat{t}, \hat{c}) = \arg\min_{(t,c)\in\{1,\cdots,\check{T}\}\times\{p,a\}} E[|\beta_t|^2] \frac{\partial \Omega(\check{B}_t^p, \check{B}_t^a)}{\partial \check{B}_t^c}$ | |
| S627 — 5: increase quantization resources of the selected combined signal element $\check{B}_{\hat{t}}^{\hat{c}} = (\check{B}_{\hat{t}}^{\hat{c}} + 1) \in \check{\mathcal{R}}_{\check{T}}$ | |
| S629 — 6: end while | |
| S630 — optimal quantization resource allocation scenario update | |
| S631 — 7: select an optimal quantization resource allocation scenario satisfying $B = \sum_{t=1}^{\check{T}} (\check{B}_t^p + \check{B}_t^a)$ (i.e., $\mathcal{R}_{\check{T}} = \check{\mathcal{R}}_{\check{T}}$) | |

METHOD AND APPARATUS FOR DISTRIBUTED COMMUNICATION BASED ON RECEPTION SIGNAL QUANTIZATION IN WIRELESS COMMUNICATION SYSTEM

CROSS-REFERENCE TO RELATED APPLICATIONS

This application claims priority to Korean Patent Applications No. 10-2020-0118547 filed on Sep. 15, 2020 and No. 10-2021-0122701 filed on Sep. 14, 2021 with the Korean Intellectual Property Office (KIPO), the entire contents of which are hereby incorporated by reference.

BACKGROUND

1. Technical Field

The present disclosure relates to distributed communication techniques based on reception signal quantization in a wireless communication system, and more particularly, to distributed communication techniques for improving communication performance of a distributed communication system including a plurality of receiving devices based on reception signal quantization.

2. Related Art

Internet of things (IoT) technology connects various things through the Internet, enables the connected things to exchange information with each other, and provides services, which can inquire information on the things or remotely control the things, to users. The things connected through the Internet may be things in the real world (e.g., temperature sensors, humidity sensors, lights, smartphones, etc.), or virtual things (e.g., SMS services, user recognition services, advertisements, etc.) existing on the Internet.

A distributed communication system or a distributed antenna communication system may be configured through a plurality of communication devices constituting a communication network such as the IoT network. In particular, in an IoT network environment in which a plurality of wireless devices are distributed at high density in a predetermined area, a spatial multiplexing gain, that the distributed communication system or distributed reception system can achieve from a wireless channel, may be maximized. In an exemplary embodiment of the distributed communication system, signals received through a plurality of distributed receiving devices may be compressed and transmitted to a central computing center or fusion center, and original information restored from the center may be transmitted to a final destination. However, in such the exemplary embodiment of the distributed communication system, since the restoration operation is performed in the central computing center or fusion center provided separately in addition to the receiving devices, excessive resources may be required in the process of compression, transmission, restoration, and the like, and a construction cost thereof may increase. In this reason, techniques for efficiently performing communication by the distributed communication system in the IoT network environment may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a user cooperative distributed communication method for improving communication performance of distributed communication based on reception signal quantization, and apparatus for the same.

According to an exemplary embodiment of the present disclosure for achieving the above-described objective, an operation method of a first receiving node in a distributed communication system may comprise: receiving a signal from a transmitting node; extracting a combined signal vector from a reception signal vector corresponding to a vector of the received signal; obtaining a compressed combined signal vector by extracting a preset number T of combined signal elements from among a plurality of combined signal elements constituting the combined signal vector; quantizing the compressed combined signal vector to obtain a quantized combined signal vector; and transmitting the quantized combined signal vector to a second receiving node included in the distributed communication system, wherein T is a natural number.

The obtaining of the quantized combined signal vector may comprise: performing a quantization operation on an amplitude of each of the T combined signal elements constituting the compressed combined signal vector to obtain quantized amplitude information for each of the T combined signal elements; performing a quantization operation on a phase of each of the T combined signal elements constituting the compressed combined signal vector to obtain quantized phase information for each of the T combined signal elements; and obtaining the quantized combined signal vector based on the quantized amplitude information and the quantized phase information obtained for each of the T combined signal elements.

The obtaining of the quantized amplitude information may comprise: determining an amplitude of a t-th combined signal element among the T combined signal elements; identifying an element having a smallest difference from the amplitude of the t-th combined signal element among elements constituting an amplitude codebook having a preset size of $B_t^a$ bits; and determining the element having the smallest difference from the amplitude of the t-th combined signal element as the quantized amplitude information for the t-th combined signal element, wherein t is a natural number equal to or greater than 1 and equal to or less than T.

The obtaining of the quantized phase information may comprise: determining a phase of a t-th combined signal element among the T combined signal elements; identifying an element having a smallest difference from the phase of the t-th combined signal element among elements constituting a phase codebook having a preset size of $B_t^p$ bits; and determining the element having the smallest difference from the phase of the t-th combined signal element as the quantized phase information for the t-th combined signal element, wherein t is a natural number equal to or greater than 1 and equal to or less than T, and the phase codebook is composed of $2^{B_t^p}$ elements that equally divide a section equal to or greater than 0 and less than $2\pi$.

The transmitting may comprise: transmitting the quantized combined signal vector to the second receiving node through a data transmission/reception link formed between the first receiving node and the second receiving node, and a capacity of the data transmission/reception link may be determined based on a sum of a size of each of T amplitude codebooks used for a quantization operation on an amplitude of each of the extracted T combined signal elements, and a size of each of T amplitude codebooks used for a quantization operation on a phase of each of the extracted T combined signal elements.

The operation method may further comprise, before the receiving of the signal, obtaining, from the second receiving node, information on the preset number T determined based on a quantization resource allocation operation, a size of each of T amplitude codebooks used for a quantization operation on an amplitude of each of the extracted T combined signal elements, and a size of each of T phase codebooks used for a quantization operation on a phase of each of the extracted T combined signal elements.

The first receiving node may correspond to one of a plurality of assistant users (AUs) included in the distributed communication system, and the second receiving node may correspond to a main user (MU) decoding a transmission signal of the transmitting node based on information transmitted from the plurality of AUs.

According to another exemplary embodiment of the present disclosure for achieving the above-described objective, an operation method of a first receiving node included in a distributed communication system may comprise: receiving a signal from a transmitting node; receiving, from each of second to K-th receiving nodes included in the distributed communication system, a quantized combined signal vector obtained based on a reception signal vector corresponding to a vector of a signal received by each of the second to K-th receiving nodes; calculating a compressed reception signal vector for each of the second to K-th receiving nodes based on the quantized combined signal vector received from each of the second to K-th receiving nodes; calculating a virtual channel matrix corresponding to channel matrices between all of the first to K-th receiving nodes and the transmitting node; calculating a virtual reception signal vector corresponding to reception signal vectors of all of the first to K-th receiving nodes based on a vector of the signal received by the first receiving node and the compressed reception signal vector for each of the second to K-th receiving nodes; calculating a relational expression between the virtual reception signal vector and a vector of a transmission signal generated by the transmitting node based on the virtual reception signal vector and the virtual channel matrix; and performing a decoding operation on the transmission signal based on the calculated relational expression, wherein K is a natural number greater than 2.

The performing of the decoding operation may comprise: calculating a covariance matrix for a quantization error plus noise (QEN) vector term included in the relational expression; and calculating a predicted value for the transmission signal based on the virtual reception signal vector, the virtual channel matrix, and the calculated covariance matrix.

The operation method may further comprise, before the receiving of the signal, allocating quantization resources used for a quantization operation for obtaining the quantized combined signal vector based on the reception signal vector at each of the second to K-th receiving nodes, and the allocating of the quantization resources may comprise: initializing a quantization resource allocation scenarios having sizes of amplitude codebooks and phase codebooks used for the quantization operation as elements, for each of arbitrary $\tilde{T}$ values, which corresponds to a number T of combined signal elements extracted to obtain a compressed combined signal vector from a combined signal vector corresponding to the reception signal vector at each of the second to K-th receiving nodes; performing iteratively updating the initialized quantization resource allocation scenario; obtaining a final quantization resource allocation scenario based on a result of the iterative updating; and transmitting quantization resource information corresponding to the final quantization resource allocation scenario to the second to K-th receiving nodes, wherein the quantization resource information may include information on a size of each of T amplitude codebooks used for a quantization operation on an amplitude of each of the T combined signal elements, and a size of each of T phase codebooks used for a quantization operation on a phase of each of the T combined signal elements.

The obtaining of the final quantization resource allocation scenario may comprise: identifying an optimal quantization resource allocation scenario for each of the arbitrary $\tilde{T}$ values obtained as the result of the iterative updating; calculating a distributed communication quality indicator for the optimal quantization resource allocation scenario for each of the arbitrary $\tilde{T}$ values; selecting one $\tilde{T}$ value that best improves the distributed communication quality indicator among the arbitrary $\tilde{T}$ values; determining the selected $\tilde{T}$ value as the number T of combined signal elements; and determining the optimal quantization resource allocation scenario corresponding to the determined number T of combined signal elements as the final quantization resource allocation scenario.

According to yet another exemplary embodiment of the present disclosure for achieving the above-described objective, a first receiving node included in a distributed communication system may comprise: a processor; a memory electronically communicating with the processor; and instructions stored in the memory, wherein when executed by the processor, the instructions may cause the first receiving node to: receive a signal from a transmitting node; extract a combined signal vector from a reception signal vector corresponding to a vector of the received signal; obtain a compressed combined signal vector by extracting a preset number T of combined signal elements from among a plurality of combined signal elements constituting the combined signal vector; quantize the compressed combined signal vector to obtain a quantized combined signal vector; and transmit the quantized combined signal vector to a second receiving node included in the distributed communication system, wherein T is a natural number.

The instructions may further cause the first receiving node to: perform a quantization operation on an amplitude of each of the T combined signal elements constituting the compressed combined signal vector to obtain quantized amplitude information for each of the T combined signal elements; perform a quantization operation on a phase of each of the T combined signal elements constituting the compressed combined signal vector to obtain quantized phase information for each of the T combined signal elements; and obtain the quantized combined signal vector based on the quantized amplitude information and the quantized phase information obtained for each of the T combined signal elements.

The instructions may further cause the first receiving node to: identify an amplitude and a phase of a t-th combined signal element among the T combined signal elements; identify an element having a smallest difference from the amplitude of the t-th combined signal element among elements constituting an amplitude codebook having a preset size of $B_t^a$ bits; determine the element having the smallest difference from the amplitude of the t-th combined signal element as the quantized amplitude information for the t-th combined signal element; identify an element having a smallest difference from the phase of the t-th combined signal element among elements constituting a phase codebook having a preset size of $B_t^p$ bits; and determine the element having the smallest difference from the phase of the t-th combined signal element as the quantized phase information for the t-th combined signal element, wherein t is a natural number equal to or greater than 1 and equal to or less than T, and the phase codebook is composed of $2^{B_t^p}$ elements that equally divide a section equal to or greater than 0 and less than $2\pi$.

The instructions may further cause the first receiving node to transmit the quantized combined signal vector to the second receiving node through a data transmission/reception link formed between the first receiving node and the second receiving node, and a capacity of the data transmission/reception link may be determined based on a sum of a size of each of T amplitude codebooks used for a quantization operation on an amplitude of each of the extracted T combined signal elements, and a size of each of T amplitude codebooks used for a quantization operation on a phase of each of the extracted T combined signal elements.

The instructions may further cause the first receiving node to, before the receiving of the signal, obtain, from the second receiving node, information on the preset number T determined based on a quantization resource allocation operation, a size of each of T amplitude codebooks used for a quantization operation on an amplitude of each of the extracted T combined signal elements, and a size of each of T phase codebooks used for a quantization operation on a phase of each of the extracted T combined signal elements.

According to an exemplary embodiment of the present disclosure, a distributed communication system may be configured to include at least one main user (MU) and a plurality of assistant users (AUs). The MU and AUs of the distributed communication system may receive a wireless transmission signal transmitted by a transmitting node. Information of the signal received at each of the AUs of the distributed communication system may be delivered to the MU in form of compressed and quantized information. The MU may restore the transmission signal transmitted by the transmitting node based on information of the signal received by itself and the compressed and quantized information transmitted from each of the AUs. A control node of the distributed communication system may perform a quantization resource allocation operation for the distributed communication operations of the distributed communication system based on a quantization scheme. Through this, distributed communication performance of the distributed communication system can be remarkably improved.

BRIEF DESCRIPTION OF DRAWINGS

FIG. 4 is a sequence chart for describing an exemplary embodiment of a distributed communication operation in a distributed communication system.

FIG. 5 is an exemplary diagram for describing an exemplary embodiment of a distributed communication algorithm in a distributed communication system.

FIG. 6 is an exemplary diagram for describing an exemplary embodiment of a quantization resource allocation algorithm in a distributed communication system.

DETAILED DESCRIPTION OF THE EMBODIMENTS

Figure 1:
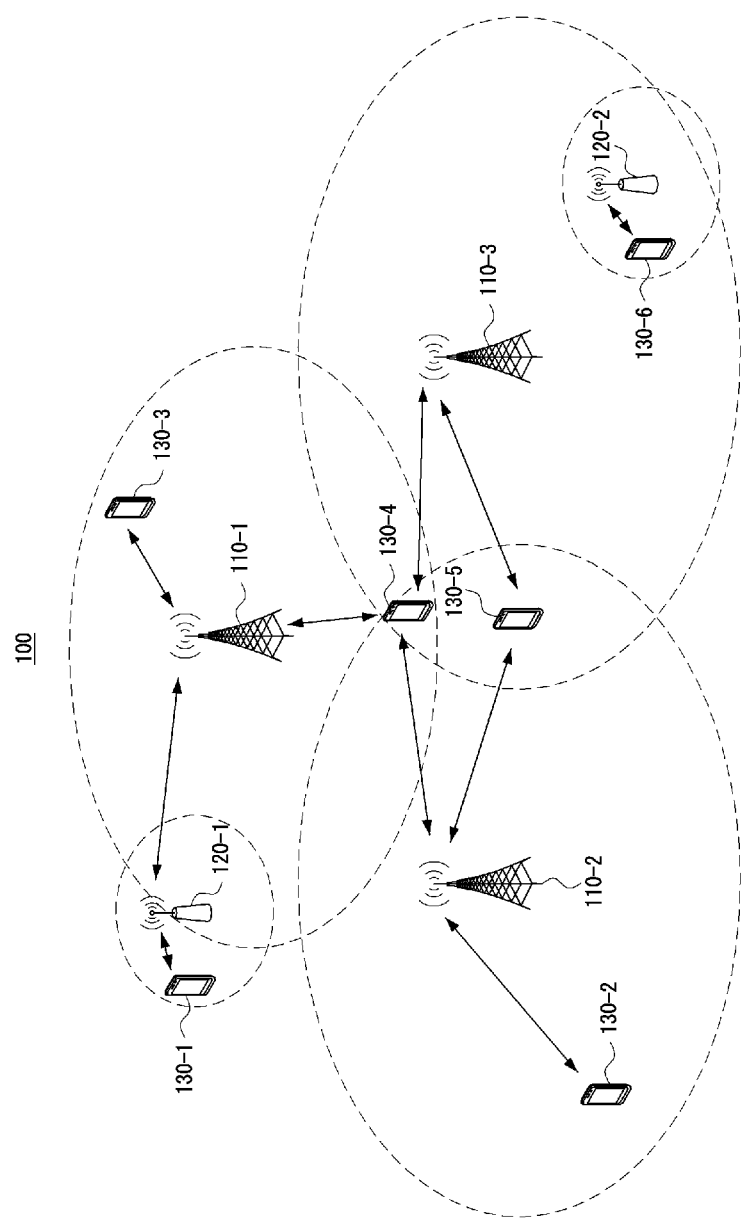
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
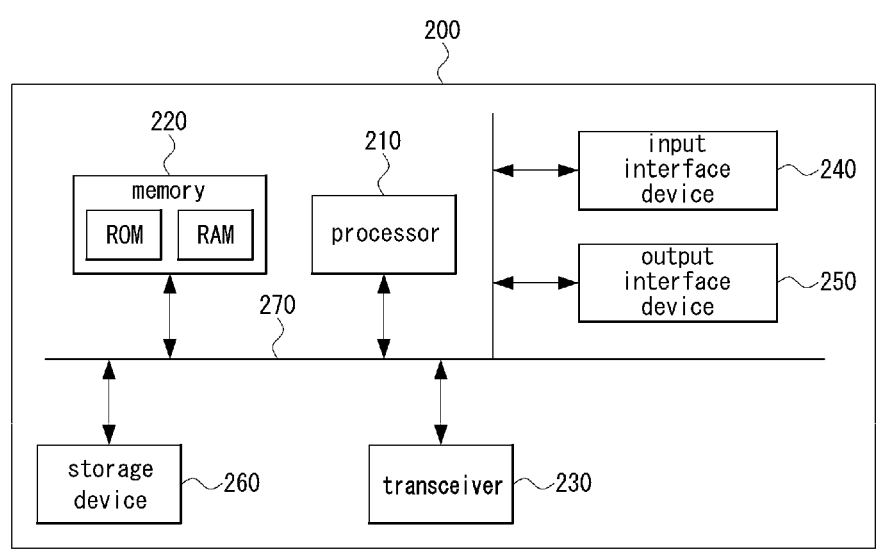
FIG. 2 is a block diagram illustrating an exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmission and reception based on reception signal quantization, methods for allocating quantization resources, and methods for decoding signals for the same in a wireless communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 3:
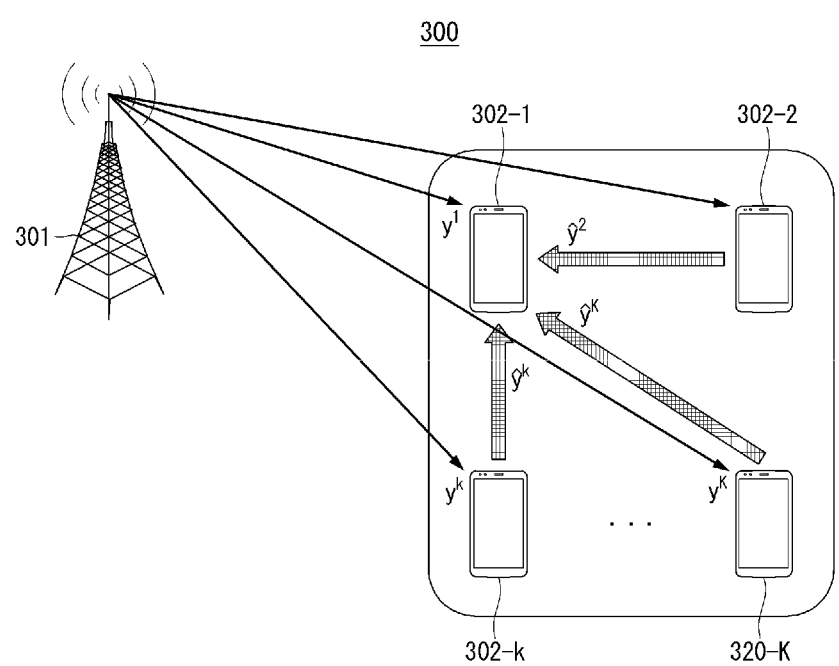
FIG. 3 is a conceptual diagram for describing an exemplary embodiment of a distributed communication system.

FIG. 3 is a conceptual diagram for describing an exemplary embodiment of a distributed communication system.

Referring to FIG. 3, a communication system 300 may include one or more transmitting nodes 301 and one or more receiving nodes 302-1, 302-2, . . . , and 302-K. That is, the communication system 300 may include K (K is a natural number greater than or equal to 1) receiving nodes 302-1, 302-2, . . . , and 302-K. FIG. 3 shows an exemplary embodiment in which the communication system 300 corresponding to a single-cell wireless network includes one transmitting node 301 and the plurality of receiving nodes 302-1, 302-2, . . . , and 302-K. However, this is only an example for convenience of description, and exemplary embodiments of the present disclosure are not limited thereto. For example, the communication system 300 may be configured to include a plurality of transmitting nodes and a plurality of receiving nodes.

The transmitting node 301 of the communication system 300 may be a communication node transmitting a wireless signal based on a wireless communication scheme. The transmitting node 301 may be referred to as a 'transmitter'. The transmitting node 301 may have M (M is a natural number greater than or equal to 1) transmit antennas.

The receiving nodes 302-1, 302-2, . . . , and 302-K of the communication system 300 may be communication nodes that receive wireless signals based on the wireless communication scheme. Each of the receiving nodes 302-1, 302-2, . . . , and 302-K may be referred to as a 'user' or 'device'. One of the receiving nodes 302-1, 302-2, . . . , and 302-K may be referred to as a 'k-th receiving node' 302-k (k is a natural number). In the present disclosure, the 'k-th receiving node' may be an expression referring to an arbitrary one of the plurality of receiving nodes. Alternatively, in the present disclosure, the 'k-th receiving node' may be an expression representing the plurality of receiving nodes.

The communication system 300 may include the first receiving node 302-1 to the K-th receiving node 302-K. The receiving nodes 302-1, 302-2, . . . , and 302-K may have the same or different number of receive antennas. In an exemplary embodiment of the communication system 300, each of the receiving nodes 302-1, 302-2, . . . , and 302-K may have N (N is a natural number greater than or equal to 1) receive antennas. Hereinafter, an exemplary embodiment of the communication system 300 will be described by taking a case in which the receiving nodes 302-1, 302-2, . . . , and 302-K all have the same number N of receive antennas as an example. However, this is only an example for convenience of description, and exemplary embodiments of the present disclosure are not limited thereto.

The transmitting node 301 of the communication system 300 may generate a wireless signal and transmit the generated wireless signal. Here, the wireless signal generated and transmitted by the transmitting node 301 may be expressed as a transmission signal s. Each of the receiving nodes 302-1, 302-2, . . . , and 302-K may receive the wireless signal transmitted from the transmitting node 301. Here, the wireless signal received by the k-th receiving node 302-k may be expressed as $y^k$. That is, the wireless signal received by the first receiving node 302-1 may be expressed as a reception signal $y^1$. The wireless signal received by the second receiving node 302-2 may be expressed as a reception signal $y^2$. The wireless signal received by the K-th receiving node 302-K may be expressed as a reception signal $y^K$. The transmission signal s generated and transmitted by the transmitting node 301 and the reception signals $y^1$ to $y^K$ received at the receiving nodes 302-1, 302-2, . . . , and 302-K may be different from each other.

In an exemplary embodiment of the communication system 300, wireless channels between the transmitting node 301 and each of the receiving nodes 302-1, 302-2, . . . , and 302-K may correspond to a block fading channel. The wireless signal $y^k$ received by the k-th receiving node 302-k may be expressed as in Equation 1.

$$y^k = \sqrt{P}H^k s + n^k \quad \text{[Equation 1]}$$

Equation 1 may correspond to an equation representing a relationship between the reception signal $y^k$ and the transmission signal s. The reception signal $y^k$ may be an element of a complex number field $\mathbb{C}^N$. P may refer to a transmit power when the transmission signal s is transmitted from the transmitting node 301. $H^k$ may denote a wireless channel matrix. $H^k$ may be an element of a complex number field $\mathbb{C}^{N \times M}$. Meanwhile, $n^k$ may mean a noise signal. The transmission signal s and the noise signal $n^k$ may follow complex normal distributions of $\mathcal{CN}\{0_M, M^{-1}I_M\}$ and $\mathcal{CN}\{0_N, \rho^{-1}I_N\}$, respectively. Here, $\mathcal{CN}\{A, B\}$ may refer to a complex normal distribution having an average of A and a variance of B. $0_M$ may refer to a column vector having a size of M and all elements of 0. $I_M$ may mean a unit matrix or identify matrix having a size of M×M. $0_N$ may mean a column vector having a size of N and all elements of 0. $\rho$ may refer to a signal-to-noise ratio (SNR). $I_N$ may mean a unit matrix or identity matrix having a size of N×N. The wireless channel matrix $H^k$ may be defined as a linear combination of non-line-of-sight (NLOS) wireless paths. For example, the wireless channel matrix $H^k$ may be expressed as in Equation 2.

$$H^k = \sqrt{NM} \sum_{v=1}^{V} \alpha_v d_N(\psi_v^{AoA}) d_M(\psi_v^{AoD}) \quad \text{[Equation 2]}$$

In Equation 2, V may denote the number of wireless paths between the k-th receiving node 302-k and the transmitting node 301, and v may be a natural number equal to or greater than 1 and less than or equal to V. $\alpha_v$ may denote a channel gain of each wireless path. The channel gain $\alpha_v$ of each wireless path may follow a complex normal distribution of $\mathcal{CN}\{0,1\}$. Each wireless path may be expressed by using an antenna array vector $d_N(\psi)=[1, e^{j\pi\psi}, \ldots, e^{(N-1)j\pi\psi}]^T$ of receive antennas and an antenna array vector $d_M(\psi)=[1, e^{j\pi\psi}, \ldots, e^{(M-1)j\pi\psi}]^T$ of transmit antennas. Assuming that each antenna is arranged with a half-wavelength gap in the antenna array, $\psi_v^{AoA}$ in the beam domain of each wireless path may be defined as $\psi_v^{AoA} = \sin\theta_v^{AoA}$. Here, $\theta_v^{AoA}$ may refer to an angle of arrival (AoA) of the v-th wireless path. On the other hand, $\psi_v^{AoD}$ in the beam domain of each wireless path may be defined as $\psi_v^{AoD} = \sin\theta_v^{AoD}$. Here, $\theta_v^{AoD}$ may refer to an angle of departure (AoD) of the v-th wireless path. Each of $\psi_v^{AoA}$ and $\psi_v^{AoD}$ may follow a uniform distribution U(−1, 1) between −1 and 1.

The wireless channel matrix $H^k$ may be expressed as in Equation 3 through singular value decomposition. In order to simplify the expression of the channel matrix, a part corresponding to a null space of the channel after the singular value decomposition may be omitted in Equation 3.

$$H^k = \sqrt{NM} \sum_{\ell=1}^{L} \beta_\ell^k u_\ell^k (v_\ell^k)^H \quad \text{[Equation 3]}$$
$$= \sqrt{NM}\, U^k B^k (V^k)^H$$

In Equation 3, L may denote a rank of the channel matrix. L may be a natural number equal to or greater than N and equal to or less than V. In Equation 3, $u_\ell^k$ may refer to the $\ell$-th ($\ell$ is a natural number greater than or equal to 1 and less than or equal to L) left singular vector, and $v_\ell^k$ may refer to the $\ell$-th right singular vector. Here, $u_\ell^k$ may be an element of the complex number $\mathbb{C}^N$, and $v_\ell^k$ may be an element of the complex number $\mathbb{C}^M$. $(v_\ell^k)^H$ may correspond to a conjugate transpose or Hermitian transpose of $v_\ell^k$. $\beta_\ell^k$ may mean the $\ell$-th singular value. A matrix $\beta_\ell^k u_\ell^k (v_\ell^k)^H$ defined based on the $\ell$-th singular value, $\ell$-th left singular vector, and $\ell$-th right singular vector may be referred to as the $\ell$-th singular direction matrix. $U^k = [u_1^k, \ldots, u_L^k]$ may be a matrix defined as a set of the left singular vectors. $V^k = [v_1^k, \ldots, v_L^k]$ may be a matrix defined as a set of the right singular vectors. $(V^k)^H$ may correspond to a conjugate transpose or Hermitian transpose of $V^k$.

$B^k = \text{diag}[\beta_1^k, \ldots, \beta_L^k]$ may be a diagonal matrix defined based on a set of the singular values.

The reception signal $y^k$ received by the k-th receiving node 302-k may be expressed as Equation 4 based on Equations 1 and 3.

$$y^k = \sqrt{PNM}\, U^k B^k (V^k)^H s + n^k \quad \text{[Equation 4]}$$
$$= \sqrt{PNM}\, U^k B^k x^k + n^k$$

In Equation 4, $x^k = (V^k)^H s$ may correspond to a combined signal vector in which the transmission signal s corresponding to transmission information and the right singular vectors are combined. The combined signal vector $x^k$ may follow a complex normal distribution of $\mathcal{CN}\{0_M, M^{-1}I_M\}$. Each element constituting the combined signal vector $x^k$ may be expressed as $x_m^k = (v_m^k)^H s$. Each element $x_m^k$ constituting the combined signal vector $x^k$ may follow a complex normal distribution of $\mathcal{CN}\{0, M^{-1}\}$.

In an exemplary embodiment of the communication system 300, the plurality of receiving nodes 302-1, 302-2, . . . , and 302-K may constitute a distributed communication system. The distributed communication system may correspond to a distributed reception system. The plurality of spatially distributed receiving nodes 302-1, 302-2, . . . , and 302-K may cooperatively receive a wireless signal by configuring one cooperation unit (CU). The plurality of receiving nodes 302-1, 302-2, . . . , and 302-K constituting the CU may be classified into a main user (MU) and assistant users (AUs). The MU may also be referred to as a main device (MD). The AU may also be referred to as an assistant device (AD). In FIG. 3, an exemplary embodiment in which the first receiving node 302-1 corresponds to the MU, and the second to K-th receiving node 302-2 to 302-K correspond to the AUs is shown as an example. However, this is only an example for convenience of description, and exemplary embodiments of the present disclosure are not limited thereto.

In an exemplary embodiment of the distributed communication system, signals received through the plurality of receiving nodes 302-1, 302-2, . . . , and 302-K may be compressed and transmitted to a central computing center or fusion center. The original information restored from the center may be transmitted to a final destination. However, in such the exemplary embodiment of the distributed communication system, since the restoration operation is performed in the central computing center or fusion center provided separately from the receiving nodes, excessive resources may be required in the process of compression, transmission, and restoration, etc., and a system construction cost thereof may increase.

On the other hand, in another exemplary embodiment of the distributed communication system, each of the plurality of receiving nodes 302-1, 302-2, . . . , and 302-K constituting the CU may receive the wireless signal transmitted by the transmitting node 301. Here, the second receiving node 302-2 to K-th receiving node 302-K corresponding to the AUs among the plurality of receiving nodes 302-1, 302-2, . . . , and 302-K may compress the received signals, respectively. In other words, each of the second receiving node 302-2 to K-th receiving node 302-K may quantize the received signal. For example, the reception signal $y^k$ received by the k-th receiving node 302-k corresponding to the AU may be calculated as in Equation 4. The k-th receiving node 302-k may quantize the reception signal $y^k$ calculated as in Equation 4. The reception signal quantized in the k-th receiving node 302-k may be expressed as $\hat{y}^k$. That is, the reception signal quantized in the second receiving node 302-2 may be expressed as $\hat{y}^2$. The reception signal quantized in the K-th receiving node 302-K may be expressed as $\hat{y}^K$. The second receiving node 302-2 to K-th receiving node 302-K corresponding to the AUs may transmit the quantized reception signals to the first receiving node 302 corresponding to the MU through data exchange links or data transmission/reception links. That is, the reception signal received and quantized in each of the second receiving node 302-2 to K-th receiving node 302-K may be transmitted to the first receiving node 302-1 without going through a separate computing center. The first receiving node 302-1 corresponding to the MU may receive the quantized reception signals from the second receiving node 302-2 to K-th receiving node 302-K. The first receiving node 302-1 may restore the transmission signal s transmitted by the transmitting node 301 based on the reception signal received by itself and the quantized reception signals received from the second to K-th receiving nodes 302-2 to 302-K. The technical characteristics of the operation of generating and transmitting the quantized reception signals by the second receiving node 302-2 to K-th receiving node 302-K corresponding to the AUs, and the operation of receiving the quantized receptions signals and restoring the transmission signal s by the first receiving node 302-1 corresponding to the MU will be described in more detail below with reference to FIG. 4.

FIG. 4 is a sequence chart for describing an exemplary embodiment of a distributed communication operation in a distributed communication system.

Referring to FIG. 4, a communication system 400 may include one or more transmitting nodes 401 and one or more receiving nodes 402-1, 402-2, . . . , and 402-K. FIG. 4 shows an exemplary embodiment in which the communication system 400 includes one transmitting node 401 and a plurality of receiving nodes 402-1, 402-2, . . . , and 402-K as an example. However, this is only an example for convenience of description, and exemplary embodiments of the present disclosure are not limited thereto. The communication system 400 may be the same as or similar to the communication system 300 described with reference to FIG. 3. The transmitting node 401 may be the same as or similar to the transmitting node 301 described with reference to FIG. 3. The plurality of receiving nodes 402-1, 402-2, . . . , and 402-K may be the same as or similar to the plurality of receiving nodes 302-1, 302-2, . . . , and 302-K described with reference to FIG. 3.

The transmitting node 401 may generate a wireless signal and transmit the generated wireless signal (S411). The transmitting node 401 may transmit the wireless signal through M transmit antennas. The signal transmitted by the transmitting node 401 may be referred to as a transmission signal s. Each of the first receiving node 402-1 to the K-th receiving node 402-K may receive the wireless signal transmitted by the transmitting node 401 (S411). Each of the first receiving node 402-1 to the K-th receiving node 402-K may receive the wireless signal transmitted by the transmitting node 401 through N receive antennas. The signal received by the k-th receiving node (k is a natural number greater than or equal to 1 and less than or equal to K) may be referred to as a reception signal $y^k$ or a reception signal vector $y^k$.

The first receiving node 402-1 to the K-th receiving node 402-K may be classified into an MU and AUs. In an exemplary embodiment of the communication system 400, the first receiving node 402-1 may correspond to the MU, and the second receiving node 402-2 to the K-th receiving node 402-K may correspond to the AUs. The first receiving node 402-1 corresponding to the MU and the second receiving node 402-2 to K-th receiving node 402-K corresponding to the AUs may constitute a distributed communication system. Each of the second receiving node 402-2 to K-th receiving node 402-K corresponding to the AUs may quantize the reception signal received by itself, and transmit it to the first receiving node 402-1 corresponding to the MU. Through this, a spatial multiplexing gain of the distributed communication system or the first receiving node 402-1 may be increased.

The reception signal $y^k$ received at the k-th receiving node including the N receive antennas may include up to N complex elements. Referring to Equation 4, the reception signal $y^k$ received at the k-th receiving node may be calculated as a vector $y^k = \sqrt{PNM} U^k B^k x^k + n^k$. Here, $U^k = [u_1^k, \ldots, u_L^k]$ may correspond to a set of left singular vectors. $B^k = \text{diag}[\beta_1^k, \ldots, \beta_L^k]$ may correspond to a set of singular values. On the other hand, $x^k$ may be a combined signal vector in which the transmission signal s and a set $V^k = [v_1^k, \ldots, v_L^k]$ of right singular vectors are combined. That is, $x^k = (V^k)^H s$. The reception signal vector $y^k$ may be calculated as a linear combination of $U^k$ corresponding to a set of left singular vectors, $B^k$ corresponding to a set of singular values, the combined signal vector $x^k$, and a noise signal vector $n^k$.

In an exemplary embodiment of the distributed communication system, the MU 402-1 may know downlink channel information of each of the AUs 402-2, ..., and 402-K. In this case, each of the AUs 402-2, ..., and 402-K may quantize only the information of the combined signal vector $x^k$ instead of quantizing all information of the reception signal vector $y^k$ to efficiently deliver the information of the reception signal to the MU 402-1. The combined signal vector $x^k$ may include L (L is a natural number greater than or equal to 1 and less than or equal to N) complex elements. The $\ell$-th complex element of the combined signal vector $x^k$ may correspond to the $\ell$-th singular direction matrix.

In quantizing the combined signal vector $x^k$, a scheme of performing a quantization operation on L complex elements or a scheme of performing a quantization operation on some extracted complex elements from among the L complex elements may be used. In quantizing the combined signal vector $x^k$, an increased channel gain may be achieved and transferred as quantization operations are performed on more complex elements. On the other hand, in quantizing the combined signal vector $x^k$, as quantization operations are performed on more complex elements, more resources may be required for the quantization operations, transmission, and decoding operations, and the like.

In quantizing the combined signal vector $x^k$, most of the channel gain may be concentrated on T (T is a natural number greater than or equal to 1 and less than or equal to L) complex elements corresponding to a part of the L complex elements. That is, $\beta_1 > \ldots > \beta_T \gg \ldots > \beta_L$ may be established when aligned based on $\beta_\ell$ corresponding to the channel gain.

In an exemplary embodiment of the communication system 400, each of the AUs 402-2, ..., and 402-K may quantize the reception signal received by itself, and transmit the quantized signal to the MU 402-1. When each of the AUs 402-2, ..., and 402-K quantize each combined signal vector $X^k$, the quantization operation may be performed on T complex elements selected among L complex elements based on the channel gain or singular value. To this end, only T elements corresponding to a preset number T of singular direction matrices may be extracted from among L elements respectively constituting $U^k$ corresponding to the set of left singular vectors, $B^k$ corresponding to the set of singular values, and $V^k$ corresponding to the set of right singular vectors. The set of extracted left singular vectors may be expressed as $\tilde{U}^k = [u_1^k, \ldots u_T^k]$. The set of extracted singular values may be expressed as $\tilde{B}^k = \text{diag}[\beta_1^k, \ldots, \beta_T^k]$. The set of extracted right singular vectors may be expressed as $\tilde{V}^k = [v_1^k, \ldots v_T^k]$.

The MU 402-1 may know information such as $\tilde{U}^k$, $\tilde{B}^k$, and $\tilde{V}^k$ for each of the AUs 402-2, ..., and 402-K. In other words, the information such as $\tilde{U}^k$, $\tilde{B}^k$, and $\tilde{V}^k$ may be provided to the MU 402-1 from each of the AUs 402-2, ..., and 402-K, and then the distributed communication procedure based on the distributed communication system may be performed. In addition, the MU 402-1 may identify an expected value of a square of each singular value constituting the set $\tilde{B}^k$ of extracted singular values based on the information provided from each of the AUs 402-2, ..., and 402-K. In other words, the MU 402-1 may identify $E[|\beta_t^k|^2]$ corresponding to the expected value of the square of the singular value $\beta_t^k$ (t is a natural number greater than or equal to 1 and less than or equal to T) constituting the set $\tilde{B}^k = \text{diag}[\beta_1^k, \ldots, \beta_T^k]$ of singular values extracted from the k-th AU.

Each of the AUs 402-2, ..., and 402-K may extract a compressed combined signal vector $\tilde{x}^k$ by compressing the reception signal $y^k$ (S413-2, ..., S413-K). Each of the AUs 402-2, ..., and 402-K may extract the compressed combined signal vector $\tilde{x}^k$ from the reception signal $y^k$ based on the operation as in Equation 5 derived based on Equation 4.

$$\frac{(\tilde{B}^k)^{-1}(\tilde{U}^k)^H y^k}{\sqrt{PNM}} = \tilde{x}^k + \tilde{n}^k \qquad \text{[Equation 5]}$$

In Equation 5, $\tilde{x}^k = [x_1, \ldots, x_T]^T$ may correspond to the combined signal vector or compressed combined signal vector composed of T complex elements. $\tilde{n}^k$ may correspond to the compressed noise signal vector or compressed noise vector. The compressed noise signal vector $\tilde{n}^k$ may be expressed as $$\tilde{n}^k \xleftarrow{} \tilde{n}^k = \frac{(\tilde{B}^k)^{-1}(\tilde{U}^k)^H n^k}{\sqrt{PNM}}.$$

The compressed noise signal vector $\tilde{x}^k$ composed of T complex elements may be regarded as being extracted and compressed from the reception signal $y^k$ composed of up to N complex elements.

Each of the AUs 402-2, ..., and 402-K may quantize the compressed combined signal vector $\tilde{x}^k$ obtained through the operation as in Equation 5 (S415-2, ..., S415-K). Specifically, the compressed combined signal vector $\tilde{x}^k$ composed of T complex elements may be expressed as in Equation 6 based on an absolute value and phase information of each complex element.

$$\tilde{x}^k = [x_1, \ldots, x_T]^T = [|x_1| e^{j\Theta_1}, \ldots, |x_T| e^{j\Theta_T}]^T \qquad \text{[Equation 6]}$$

In Equation 6, $|x_t|$ may correspond to an absolute value or amplitude of the t-th complex element $x_t$. $\theta_t$ may correspond to phase information of the t-th complex element $x_t$. That is, for each of the AUs 402-2, ..., and 402-K, the amplitude and phase information for each of the T complex elements constituting the compressed combined signal vector $\tilde{x}^k$ may be obtained. Each of the AUs 402-2, ..., and 402-K may individually perform a quantization operation on the amplitude and phase information for each of the T complex elements constituting the compressed combined signal vector. For example, in the k-th receiving node, which is an AU, the amplitude $|x_t|$ of the t-th complex element $x_t$ among T complex elements constituting the compressed combined signal vector $\tilde{x}^k$ may be quantized as in Equation 7.

$$|\hat{x}_t| = \underset{\tilde{v} \in C_{B_t^a}^a}{\operatorname{argmin}} |\tilde{v} - |x_t||^2 \qquad \text{[Equation 7]}$$

In Equation 7, $C_{B_t^a}^a$ may correspond to an amplitude codebook having a size of $B_t^a$ bits. The amplitude codebook may include $2^{B_t^a}$ elements, and each element may correspond to an amplitude quantization level. The quantized amplitude information $|\hat{x}_t|$ may be selected as a value having the smallest difference from the amplitude $|x_t|$ among the amplitude quantization levels constituting the amplitude codebook $C_{B_t^a}^a$. The amplitude codebook may be constructed in a manner that a person skilled in the art determines appropriate to improve the performance of the distributed communication system based on the quantization operations. For example, in an exemplary embodiment of the communication system 400, the amplitude codebook may be constructed based on a Lloyd-Max quantizer based on a Lloyd-Max algorithm. In an exemplary embodiment of the communication system 400, the amplitude codebook $C_{B_t^a}^a$ may be configured as in Equation 8.

$$C_{B_t^a}^a = \{v_b \in \mathbb{R} \mid b \in \{1, \ldots, 2^{B_t^a}\}\} \qquad \text{[Equation 8]}$$

In Equation 8, $v_b$ may correspond to the b-th element among $2^{B_t^a}$ elements constituting the amplitude codebook. That is, $v_b$ may correspond to the b-th amplitude quantization level constituting the amplitude codebook.

On the other hand, the phase $\theta_t$ of the t-th complex element $x_t$ among the T complex elements constituting the compressed combined signal vector $\tilde{x}^k$ may be quantized as in Equation 9.

$$\hat{\theta}_t = \underset{\tilde{v} \in C_{B_t^p}^p}{\operatorname{argmin}} |\tilde{\theta} - \theta_t|^2 \qquad \text{[Equation 9]}$$

In Equation 9, $C_{B_t^p}^p$ may correspond to a phase codebook having a size of $B_t^p$ bits. The phase codebook may include $2^{B_t^p}$ elements, and each element may correspond to a phase quantization level. The quantized phase information $\hat{\theta}_t$ may be selected as a value having the smallest difference from the phase $\theta_t$ among the phase quantization levels constituting the phase codebook $C_{B_t^p}^p$. The phase codebook may be configured in a manner that a person skilled in the art determines appropriate to improve the performance of the distributed communication system based on the quantization operations. For example, in an exemplary embodiment of the communication system 400, the phase codebook $C_{B_t^p}^p$ may be configured as in Equation 10.

$$C_{B_t^p}^p = \left\{0, 2\pi\left(\frac{1}{2^{B_t^p}}\right), \ldots, 2\pi\left(\frac{2^{B_t^p}-2}{2^{B_t^p}}\right), 2\pi\left(\frac{2^{B_t^p}-1}{2^{B_t^p}}\right)\right\} \qquad \text{[Equation 10]}$$

Referring to Equation 10, the phase codebook $C_{B_t^p}^p$ may include $2^{B_t^p}$ elements. The phase codebook $C_{B_t^p}^p$ may include $2^{B_t^p}$ elements equally dividing a section of $[0, 2\pi]$. In other words, the phase codebook $C_{B_t^p}^p$ may include $2^{B_t^p}$ elements that equally divide a section equal to or greater than 0 and less than $2\pi$.

The k-th receiving node may obtain the quantized amplitude information $|\hat{x}_t|$ and the quantized phase information $\hat{\theta}_t$ with respect to $x_t$, which is the t-th complex element among T complex elements constituting the compressed combined signal vector $\tilde{x}^k$, based on the operation as in Equations 7 and 9. The k-th receiving node may obtain the quantized combined signal vector $\hat{x}^k$ based on the quantized amplitude information $|\hat{x}_t|$ and the quantized phase information $\hat{\theta}_t$. For example, the quantized combined signal vector $\hat{x}^k$ may be obtained as in Equation 11.

$$\hat{x}^k = [|\hat{x}_1|e^{j\hat{\theta}_1}, \ldots, |\hat{x}_T|e^{j\hat{\theta}_T}]^T \qquad \text{[Equation 11]}$$

Each of the AUs 402-2, ..., and 402-K may transmit the quantized combined signal vector $\hat{x}^k$ obtained as in Equation 11 to the AU 402-1 (S417-2, ..., S417-K). To this end, a data transmission/reception link may be formed between each of the AUs 402-2, ..., and 402-K and the MU 402-1. In order for the information of the quantized combined signal vector to be transmitted without errors, each data transmission/reception link may have a capacity or size proportional to at least B bits defined in Equation 12.

$$B = \sum_{t=1}^{T}(B_t^p + B_t^a) \qquad \text{[Equation 12]}$$

In Equation 12, $B_t^a$ may correspond to the size of the amplitude codebook and $B_t^p$ may correspond to the size of the phase codebook. That is, when the amplitude codebook has the size of $B_t^a$ bits and the phase codebook has the size of $B_t^p$ bits, each data transmission/reception link may have at least a capacity or size proportional to $B = \sum_{t=1}^{T}(B_t^p + B_b^a)$ defined as in Equation 12. That is, the size of the data transmission/reception link may be determined based on a sum of the sizes of all the codebooks used to quantize the amplitudes and phases of T complex elements.

The MU 402-1 may receive the quantized combined signal vector $\hat{x}^k$ from each of the AUs 402-2, ..., and 402-K (S417-2, ..., S417-K). The MU 402-1 may calculate a compressed reception signal vector $\hat{y}^k$ for each of the AUs 402-2, ..., and 402-K based on the quantized combined signal vector $\hat{x}^k$ received from each of the AUs 402-2, ..., and 402-K. The compressed reception signal vector $\hat{y}^k$ may be referred also to as the quantized reception signal vector $\hat{y}^k$. Specifically, the quantized combined signal vector $\hat{x}^k$ may be regarded as being quantized in association with T complex elements or T singular direction matrices. Based on the combination of the T singular direction matrices, a compressed channel matrix $\tilde{H}^k$ may be defined or calculated. The compressed channel matrix $\tilde{H}^k$ may be calculated as in Equation 13.

$$\tilde{H}^k = \tilde{U}^k \tilde{B}^k (\tilde{V}^k)^H \qquad \text{[Equation 13]}$$

Based on the compressed channel matrix $\tilde{H}^k$ and the quantized combined signal vector $\hat{x}^k$, the compressed reception signal vector $\hat{y}^k$ may be calculated as in Equation 14.

$$\hat{y}^k = \sqrt{PNM}\tilde{U}^k\tilde{B}^k\hat{x}^k \qquad \text{[Equation 14]}$$

The MU 402-1 may define or calculate a virtual channel matrix $\overline{H}$ corresponding to a channel matrix between all of the receiving nodes 402-1, . . . , and 402-K and the transmitting node 401 of the distributed communication system to restore the transmission signal s based on the compressed reception signal vector $\hat{y}^k$ (S423). The virtual channel matrix $\overline{H}$ may be calculated based on a channel matrix $H^1$ of the MU 402-1 and the compressed channel matrix $\tilde{H}^k$ for each of the AUs 402-2, . . . , and 402-K. For example, the virtual channel matrix $\overline{H}$ may be calculated as in Equation 15.

$$\overline{H}=[(H^1)^H, \ldots, (\tilde{H}^{KH})^H] \in \mathbb{C}^{KN \times M} \quad \text{[Equation 15]}$$

On the other hand, the MU 402-1 may 0calculate a virtual reception signal vector $\overline{y}$ based on a reception signal vector $y^1$ directly received by itself in the step S411, and the compressed reception signal vectors $\hat{y}^2, \ldots, \hat{y}^K$ respectively calculated for the AUs 402-2, . . . , and 402-K (S425). For example, the virtual reception signal vector $\overline{y}$ may be calculated as in Equation 16.

$$\overline{y}=[(y^1)^H, (\hat{y}^2)^H, \ldots, (\hat{y}^K)^H]^H \in \mathbb{C}^{KN} \quad \text{[Equation 16]}$$

Based on the virtual channel matrix $\overline{H}$ calculated as in Equation 15, the virtual reception signal vector $\overline{y}$ calculated as in Equation 16, and the like, the MU 402-1 may restore the transmission signal s transmitted by the transmitting node 401 (S430). The technical characteristics of the transmission signal restoration operation by the MU 402-1 will be described in more detail below with reference to FIG. 5.

FIG. 5 is an exemplary diagram for describing an exemplary embodiment of a distributed communication algorithm in a distributed communication system.

Referring to FIG. 5, a communication system may include one or more transmitting nodes and a plurality of receiving nodes. The plurality of receiving nodes may constitute a distributed communication system. The distributed communication system may correspond to a distributed reception system. The plurality of reception nodes may be classified into an MU and AUs. FIG. 5 shows an exemplary embodiment of a distributed communication algorithm by which the distributed communication system including one MU and a plurality of AUs receiving a wireless signal transmitted by one transmitting node performs a distributed communication operation. However, this is only an example for convenience of description, and exemplary embodiments of the present disclosure are not limited thereto. Here, the transmitting node may be the same as or similar to the transmitting node 401 described with reference to FIG. 4. The MU may be the same as or similar to the MU 402-1 described with reference to FIG. 4. The plurality of AUs may be the same as or similar to the AUs 402-2, . . . , and 402-K described with reference to FIG. 4.

The distributed communication system may perform a distributed communication operation or a distributed reception operation based on signal quantizers. In an exemplary embodiment of the distributed communication system, the MU and the plurality of AUs may receive a signal transmitted by the transmitting node. Each of the plurality of AUs may compress and quantize a reception signal received by itself (S510). The quantized reception signals may be transmitted to the MU. The MU may perform an operation based on virtual transmission signal-reception signal relational expressions in order to perform decoding on the quantized reception signals transmitted from the AUs (S520). The MU may decode the transmission signal based on a result of the operation in the step S520 (S530).

Each of the plurality of AUs may compress and quantize the signal received by itself (S510). Specifically, all the users (i.e., MU and AUs) constituting the distributed communication system may receive the wireless signal transmitted by the transmitting node (S511). The operation according to the step S511 may be the same as or similar to the operation according to the step S411 described with reference to FIG. 4. Here, the reception signal $y^k$ received by each of the users may be calculated based on the same or similar equation as Equation 4. For example, the reception signal $y^k$ may be calculated as $$y^k = \sqrt{PNM} U^k B^k x^k + n^k.$$

Each of the plurality of AUs may compress the reception signal $y^k$ received by itself, and extract $\tilde{x}^k$ corresponding to a combined signal vector or compressed combined signal vector (S513). The operations according to the step S513 may be the same as or similar to the operations according to the steps S413-2 to S413-K described with reference to FIG. 4. Here, the compressed combined signal vector $\tilde{x}^k$ may be calculated based on the same or similar equation to Equation 5. For example, a sum of the compressed combined signal vector $\tilde{x}^k$ and the compressed noise signal vector $\tilde{n}^k$ may be calculated as $$\frac{(\tilde{B}^k)^{-1}(\tilde{U}^k)^H y^k}{\sqrt{PNM}} = \tilde{x}^k + \tilde{n}^k.$$

Each of the plurality of AUs may quantize the amplitude information and the phase information constituting the compressed combined signal vector $\tilde{x}^k$ to obtain a quantized combined signal vector $\hat{x}^k$ (S515). The operations according to the step S515 may be the same as or similar to the operations according to the steps S415-2 to S415-K described with reference to FIG. 4.

The quantized combined signal vector $\hat{x}^k$ may be different from the compressed combined signal vector $\tilde{x}^k$. The quantized combined signal vector $\hat{x}^k$ may be different from the sum of the compressed combined signal vector $\tilde{x}^k$ and the compressed noise signal vector $\tilde{n}^k$. For example, the quantized combined signal vector $\hat{x}^k$ may be expressed as in Equation 17.

$$\hat{x}^k = \tilde{x}^k + \tilde{e}^k + \tilde{n}^k \quad \text{[Equation 17]}$$

In Equation 17, $\tilde{e}^k$ may correspond to a signal quantization error.

Each of the plurality of AUs may transmit the quantized combined signal vector $\hat{x}^k$ obtained in the step S515 to the MU (S517). The operations according to the step S517 may be the same as or similar to the operations according to the steps S417-2 to S417-K described with reference to FIG. 4.

The MU may perform an operation based on the virtual transmission signal-reception signal relational expressions in order to perform decoding on the quantized reception signals transmitted from the AUs (S520). Specifically, the MU may define or calculate a compressed reception signal $\hat{y}^k = \sqrt{PNM} \tilde{U}^k \tilde{B}^k \hat{x}^k$ based on the quantized reception signal $\hat{x}^k$ delivered from each of the AUs (S521). The operations according to the step S521 may be the same as or similar to the operations according to the step S421 described with reference to FIG. 4. The MU may calculate the compressed reception signal $\hat{y}^k$ by performing the operations based on Equations 13, 14, and 17. For example, the MU may calculate the compressed reception signal $\hat{y}^k$ for each of the AUs as in Equation 18.

$$\hat{y}^k = \sqrt{PNM}\,\tilde{U}^k \tilde{B}^k (\tilde{x}^k + \tilde{e}^k + \tilde{n}^k) \quad \text{[Equation 18]}$$
$$= \sqrt{P}\,\tilde{H}^k s + \tilde{e}_{\textit{eff}}^k + \tilde{n}_{\textit{eff}}^k$$

In Equation 18, $\tilde{e}_{\textit{eff}}^k = \sqrt{PNM}\tilde{U}^k\tilde{B}^k\tilde{e}^k$ may correspond to an effective quantization error signal vector, and $\tilde{n}_{\textit{eff}}^k = \sqrt{PNM}\tilde{U}^k\tilde{B}^k\tilde{n}^k$ may correspond to an effective noise signal vector.

The MU may define or calculate the virtual channel matrix $\overline{H}=[(\tilde{H}^1)^H, (\tilde{H}^2)^H, \ldots, (\tilde{H}^K)^H]^H$ corresponding to the channel matrix between all of the receiving nodes (i.e., MU and AUs) of the distributed communication system and the transmitting node to restore the transmission signal s based on the compressed reception signal vector $\hat{y}^k$ for each of the AU (S523). The operations according to the step S523 may be the same as or similar to the operations according to the step S423 described with reference to FIG. 4.

On the other hand, the MU 402-1 may calculate a virtual reception signal vector $\overline{y}=[(y^1)^H, (\hat{y}^2)^H, \ldots, (\hat{y}^K)^H]^H$ for all of the receiving nodes of the distributed communication system based on the reception signal vector $y^1$ directly received by itself in the step S511, and the compressed reception signal vectors $\hat{y}^2, \ldots, \hat{y}^K$ respectively calculated for the AUs (S525). The operations according to the step S525 may be the same as or similar to the operations according to the operation S425 described with reference to FIG. 4.

The MU may define or calculate a relationship between the transmission signal and the reception signals for all the receiving nodes of the distributed communication system based on the virtual reception signal vector $\overline{y}$ and the virtual channel matrix $\overline{H}$ for all the receiving nodes of the distributed communication system. For example, the relationship between the transmission signal and the reception signals for all the receiving nodes of the distributed communication system may be calculated as in Equation 19.

$$\overline{y}=\sqrt{P}\overline{H}s+\overline{q} \quad \text{[Equation 19]}$$

Here, $\overline{q}$ may correspond to a quantization error plus noise (QEN) signal vector in a compressed form. The QEN signal vector $\overline{q}$ may be expressed as in Equation 20.

$$\overline{q} = \begin{bmatrix} 0 \\ \tilde{e}_{\textit{eff}}^2 \\ \vdots \\ \tilde{e}_{\textit{eff}}^K \end{bmatrix} + \begin{bmatrix} 0 \\ \tilde{n}_{\textit{eff}}^2 \\ \vdots \\ \tilde{n}_{\textit{eff}}^K \end{bmatrix} \quad \text{[Equation 20]}$$

The MU may perform decoding on the transmission signal s based on the relationship between the transmission signal and the reception signals for all the receiving nodes of the distributed communication system calculated through the step S520 (S530). Specifically, the MU may calculate a covariance matrix $C_{\overline{q}}$ for the QEN signal vector $\overline{q}$ (S531). For example, the covariance matrix $C_{\overline{q}}$ for the QEN signal vector $\overline{q}$ may be calculated as in Equation 21.

$$C_{\overline{q}} = \begin{bmatrix} C^N & 0 & 0 & 0 \\ 0 & C_{\textit{eff}}^{QEN} & 0 & 0 \\ 0 & 0 & \ddots & 0 \\ 0 & 0 & 0 & C_{\textit{eff}}^{QEN} \end{bmatrix} \quad \text{[Equation 21]}$$

In Equation 21, $C^N$ may refer to a covariance of the MU with respect to the noise vector. $C^N$ may be calculated as in Equation 22.

$$C^N = \rho^{-1} I_N \quad \text{[Equation 22]}$$

Meanwhile, $C_{\textit{eff}}^{QEN}$ may refer to a covariance of the AU with respect to the quantization error. $C_{\textit{eff}}^{QEN}$ may be calculated as in Equation 23.

$$C_{\textit{eff}}^{QEN} = \left( PM \sum_{t=1}^{T} \Omega(B_t^p, B_t^p) |\beta_t|^2 + T(\rho N)^{-1} \right) I_N \quad \text{[Equation 23]}$$

In Equation 23, $\Omega(B_t^p, B_t^p)$ may refer to an expected value of a quantization error when the phase codebook has a size of $B_t^p$ bits and the amplitude codebook has a size of $B_t^a$ bits. $E[|\beta_t|^2]$ may refer to an expected value of a square of a magnitude of the t-th singular value $\beta_t$.

The MU may perform transmission signal decoding based on the virtual reception signal vector $\overline{y}$ calculated as in Equation 19 and the covariance matrix $C_{\overline{q}}$ calculated as in Equation 21 (S533). Specifically, a signal decoding apparatus by which the MU performs signal decoding based on the covariance matrix $C_{\overline{q}}$ may be designed or configured. The signal decoding apparatus may calculate $\hat{s}$, which is a predicted value of the transmission signal s, based on the virtual reception signal vector $\overline{y}$ and the covariance matrix $C_{\overline{q}}$ calculated as in Equation 21. The signal decoding apparatus may correspond to a signal decoding apparatus according to a minimum mean square error (MMSE) scheme. The MU or the signal decoding apparatus may calculate $\hat{s}$, which is the predicted value of the transmission signal s, as in Equation 24.

$$\hat{s} = \frac{1}{\sqrt{P}}(\overline{H}^H C_{\overline{q}}^{-1}\overline{H} + MP^{-1}I_M)\overline{H}^H C_{\overline{q}}^{-1}\overline{y} \quad \text{[Equation 24]}$$

As in the step S533, the MU may perform decoding on the transmission signal s by calculating $\hat{s}$, which is a predicted value of the transmission signal s.

FIG. 6 is an exemplary diagram for describing an exemplary embodiment of a quantization resource allocation algorithm in a distributed communication system.

Referring to FIG. 6, a communication system may include one or more transmitting nodes and a plurality of receiving nodes. The plurality of receiving nodes may constitute a distributed communication system. The distributed communication system may correspond to a distributed reception system. The plurality of reception nodes may be classified into an MU and AUs. FIG. 6 shows an exemplary embodiment of a distributed communication algorithm by which the distributed communication system including one MU and a plurality of AUs receiving a wireless signal transmitted by one transmitting node performs a distributed communication operation. The quantization resource allocation algorithm may be referred to as a quantization-bit allocation algorithm. In the distributed communication system, configuration or allocation of quantization resources used for the distributed communication operation may be performed based on the same or similar quantization resource allocation algorithm as shown in FIG. 6. However, this is only an example for convenience of description, and exemplary embodiments of the present disclosure are not limited thereto. Here, the transmitting node may be the same as or similar to the transmitting node 401 described with reference to FIG. 4.

The MU may be the same as or similar to the MU 402-1 described with reference to FIG. 4. The plurality of AUs may be the same as or similar to the AUs 402-2, . . . , and 402-K described with reference to FIG. 4.

In an exemplary embodiment of the distributed communication system, the MU and AUs may receive a wireless signal transmitted by the transmitting node. Each of the AUs may extract a combined signal $x^k$ from a reception signal $y^k$ received by itself. Each of the AUs may quantize the extracted combined signal $x^k$ to generate a quantized combined signal $\hat{x}^k$. Each of the AUs may transmit the quantized combined signal $\hat{x}^k$ to the MU. The MU may perform restoration on a transmission signal s based on the quantized combined signal $\hat{x}^k$ received from each of the AUs and a reception signal $y^1$ received by the MU itself.

In quantizing the combined signal vector $x^k$, only T combined signal elements corresponding to a part of a plurality of complex elements (i.e., combined signal elements) constituting the combined signal vector $x^k$ may be extracted and used. Each of the AUs may extract T combined signal elements from the combined signal vector $x^k$, and generate a compressed combined signal vector $\tilde{x}^k = [x_1, \ldots, x_T]^T$ by compressing the extracted T combined signal elements. Each of the AUs may perform a quantization operation on each of the combined signal elements constituting the compressed combined signal vector $\tilde{x}^k$. Each of the AUs may perform a quantization operation on an amplitude and a phase of a combined signal element $x_t$ (t is a natural number greater than or equal to 1 and less than or equal to T) constituting the compressed combined signal vector $\tilde{x}^k$. The amplitude $|x_t|$ of the combined signal element $x_t$ may be quantized through the same or similar operation as in Equation 7. The amplitude $|x_t|$ of the combined signal element $x_t$ may be quantized based on an amplitude codebook having a size of $B_t^a$ bits. The phase $\theta_t$ of the combined signal element $x_t$ may be quantized through the same or similar operation as in Equation 9. The phase $\theta_t$ of the combined signal element $x_t$ may be quantized based on a phase codebook having a size of $B_t^p$ bits. Each of the AUs may obtain a quantized combined signal vector $\hat{x}^k$ through the quantization operation on the compressed combined signal vector $\tilde{x}^k$. Each of the AUs may deliver the obtained quantized combined signal vector $\hat{x}^k$ to the MU. To this end, a data exchange link having a size of at least B bits may be formed between each of the AUs and the MU. Here, B may be determined by the sizes of the phase codebook and amplitude codebook used to quantize the amplitude and phase of each of the combined signal elements. For example, B may be defined as $B = \sum_{t=1}^{T}(B_t^p + B_t^a)$.

As the number T of the combined signal elements extracted to compress the combined signal vector $x^k$ to generate the compressed combined signal vector $\tilde{x}^k$ has a larger value, the amount of channel gain included in the compressed combined signal vector $\tilde{x}^k$ or the quantized combined signal vector $\hat{x}^k$ may increase. In other words, as the number of singular direction matrices considered in the process of generating the compressed combined signal vector increases, the amount of channel included in the compressed combined signal vector $\tilde{x}^k$ or the quantized combined signal vector $\hat{x}^k$ may increase. As the size $B_t^p$ of the phase codebook and the size $B_t^a$ of the amplitude codebook used for the quantization operation on the compressed combined signal vector $\tilde{x}^k$ have larger values, the quantization performance of the AUs and the decoding performance of the MU may be improved. In other words, as the resolution of the phase codebook and the amplitude codebook increases, the quantization performance of the AUs and the decoding performance of the MU may be improved. The operations such as the reception signal quantization, quantized reception signal transmission, and transmission signal decoding may be collectively referred to as a 'quantization-based reception operation'.

On the other hand, as the number T of extracted combined signal elements, the size $B_t^p$ of the phase codebook, and the size $B_t^a$ of the amplitude codebook have larger values, the overhead of the data exchange links between the MU and the AUs constituting the distributed communication system may be increased. In other words, as the number T of extracted combined signal elements, the size $B_t^p$ of the phase codebook, and the size $B_t^a$ of the amplitude codebook have larger values, the amount of resources required for the quantization-based reception operation of the distributed communication system (hereinafter, 'quantization resources') may be increased. A set of total quantization resources may be expressed as a 'quantization resource set $\mathcal{R}$'.

The total amount of quantization resources available in the distributed communication system may be restricted. The total amount of quantization resources available in the distributed communication system may be variably changed according to a communication situation or a network environment. In order to adaptively perform the quantization-based reception operation in a network adaptive manner, the distributed reception system may variably set the number T of extracted combined signal elements, the size $B_t^p$ of the phase codebook, and the size $B_t^a$ of the amplitude codebook, which are applied to the quantization-based reception operation. The number of extracted combined signal elements that is variably set may be expressed as the variable number $\breve{T}$ of combined signal elements. The size of the phase codebook that is variably set may be expressed as a variable phase codebook size $\breve{B}_t^p$. The size of the amplitude codebook that is variably set may be expressed as a variable amplitude codebook size $\breve{B}_t^a$. The quantization resource set that is variably set may be expressed as a variable quantization resource set $\breve{\mathcal{R}}_{\breve{T}}$. Here, the variable quantization resource set $\breve{\mathcal{R}}_{\breve{T}}$ may be expressed as $\breve{\mathcal{R}}_{\breve{T}} = \{(\breve{B}_1^p, \breve{B}_1^a), \ldots, (\breve{B}_{\breve{T}}^p, \breve{B}_{\breve{T}}^p, \breve{B}_{\breve{T}}^a)\}$ or $\breve{\mathcal{R}}_{\breve{T}} = \{\breve{B}_1^p, \breve{B}_1^a, \ldots, \breve{B}_{\breve{T}}^p, \breve{B}_{\breve{T}}^a\}$. The variable quantization resource set $\breve{\mathcal{R}}_{\breve{T}}$ may be referred to as a 'quantization resource allocation scenario'. The total amount of quantization resources (or the total amount of overhead) used in a given quantization resource allocation scenario $\breve{\mathcal{R}}_{\breve{T}}$ may be equal to $\breve{B} = \sum_{t=1}^{\breve{T}}(\breve{B}_t^p + \breve{B}_t^a)$.

In the distributed communication system, a quantization resource allocation operation for adjusting the quantization resource allocation scenario $\breve{\mathcal{R}}_{\breve{T}}$ may be performed. The quantization resource allocation operation may be performed by a control node included in the distributed communication system. Here, the control node may be a communication node that is connected to other communication nodes of the distributed communication system by wire or wirelessly to control the distributed communication operations of the distributed communication system. The control node may be the MU of the distributed communication system. Alternatively, the control node may be a communication node provided separately from the MU and the AUs to control the MU and the AU.

The quantization resource allocation operation may be performed based on a predetermined quantization resource allocation algorithm. For example, the quantization resource allocation operation in the distributed communication system may be performed based on the quantization resource allocation algorithm as shown in FIG. 6. Through the quantization resource allocation operation, the quantization resource allocation scenario may be optimized. In other words, an optimal quantization resource allocation scenario may be derived through the quantization resource allocation operation. An optimal quantization resource scenario for an arbitrary $\check{T}$, which is derived through the quantization resource allocation operation, may be expressed as an optimal quantization resource scenario $\mathcal{R}_{\check{T}}$. Among the optimal quantization resource scenarios $\mathcal{R}_{\check{T}}$ for the arbitrary $\check{T}$, a scenario that achieves the best communication quality may be referred to as a final quantization resource scenario $\mathcal{R}_{\check{T}}$.

In an exemplary embodiment of the quantization resource allocation algorithm, the control node may initialize a quantization resource allocation scenario $\check{\mathcal{R}}_{\check{T}}$ for an arbitrary $\check{T}$ (S610). The control node may perform an operation of iteratively updating the initialized quantization resource allocation scenario $\check{\mathcal{R}}_{\check{T}}$ (S620). When the quantization resource allocation scenario $\mathcal{R}_{\check{T}}$ satisfies a predetermined criterion through the iterative update operation, the control node may determine the quantization resource allocation scenario $\mathcal{R}_{\check{T}}$ at that time as the optimal quantization resource allocation scenario $\mathcal{R}_{\check{T}}$ for $\check{T}$ (S630).

Specifically, the control node may initialize a quantization resource allocation scenario $\check{\mathcal{R}}_{\check{T}}$ for the arbitrary $\check{T}$ (S610). The control node may perform an initialization operation of setting values of all elements constituting the quantization resource allocation scenario $\check{\mathcal{R}}_{\check{T}}$ for $\check{T}$ to 1 (S611). Expressing this as an equation, it may be expressed as Equation 25.

$$\check{\mathcal{R}}_{\check{T}} = \{\check{B}_1^p, \check{B}_1^a, \ldots, \check{B}_{\check{T}}^p, \check{B}_{\check{T}}^a\} = \{1, 1, \ldots, 1, 1\} \quad \text{[Equation 25]}$$

The initialization operation according to the step S611 may be expressed also as $$\check{\mathcal{R}}_{\check{T}} = \{(\check{B}_1^p, \check{B}_1^a), \ldots, (\check{B}_{\check{T}}^p, \check{B}_{\check{T}}^a)\} = \{(1, 1), \ldots, (1, 1)\}.$$

The control node may perform an operation of iteratively updating the initialized quantization resource allocation scenario $\check{\mathcal{R}}_{\check{T}}$ (S620). The control node may perform the iterative update operation according to the step S620 while the value of $\check{B}$ corresponding to the total amount of quantization resources (or the total amount of overhead) used in the quantization resource allocation scenario $\check{\mathcal{R}}_{\check{T}}$ is less than a preset value B (S621). Expressing this as an equation, it may be expressed as Equation 26.

$$\check{B} = \sum_{t=1}^{\check{T}} \left( \check{B}_t^p + \check{B}_t^a \right) < B \quad \text{[Equation 26]}$$

Here, the preset value of B may correspond to the total amount of quantization resources available in the communication network or the distributed communication system.

The control node may calculate a gradient function of an objective function for the quantization resource allocation scenario $\check{\mathcal{R}}_{\check{T}}$ (S623). Here, the objective function for the quantization resource allocation scenario $\check{\mathcal{R}}_{\check{T}}$ may be calculated as in Equation 27.

$$\sum_{t=1}^{\check{T}} \Omega\left( \check{B}_t^p + \check{B}_t^a \right) E[|\beta_t|^2] \quad \text{[Equation 27]}$$

In Equation 27, $\Omega(\check{B}_t^p, \check{B}_t^a)$ may mean an expected value of a quantization error when the phase codebook has a size of $\check{B}_t^p$ bits and the amplitude codebook has a size of $\check{B}_t^a$ bits. $E[|\beta_t|^2]$ may refer to an expected value of a square of the magnitude of the t-th singular value $\beta_t$. The gradient function of the objective function for the quantization resource allocation scenario $\check{\mathcal{R}}_{\check{T}}$ may be calculated as in Equation 28.

$$\nabla_{\check{\mathcal{R}}_{\check{T}}} \sum_{t=1}^{\check{T}} \Omega\left( \check{B}_t^p + \check{B}_t^a \right) E[|\beta_t|^2] = \quad \text{[Equation 28]}$$

$$\left( E[|\beta_1|^2] \frac{\partial \Omega(\check{B}_1^p, \check{B}_1^a)}{\partial B_1^p}, E[|\beta_1|^2] \frac{\partial \Omega(\check{B}_1^p, \check{B}_1^a)}{\partial B_1^a}, \right.$$

$$\left. \ldots, E[|\beta_{\check{T}}|^2] \frac{\partial \Omega(\check{B}_{\check{T}}^p, \check{B}_{\check{T}}^a)}{\partial B_{\check{T}}^p}, E[|\beta_{\check{T}}|^2] \frac{\partial \Omega(\check{B}_{\check{T}}^p, \check{B}_{\check{T}}^a)}{\partial B_{\check{T}}^a} \right)$$

The control node may identify a component having a minimum value among $2\check{T}$ partial differentiation or partial derivative components included in Equation 28. In other words, the control node may select a combined signal element $\hat{t}$ and a codebook type $\hat{c}$ corresponding to the component having the minimum value among the $2\check{T}$ partial differentiation or partial derivative components included in Equation 28 (S625). Expressing this as an equation, it may be expressed as Equation 29.

$$(\hat{t}, \hat{c}) = \operatorname*{argmin}_{(t,c) \in \{1,\ldots,\check{T}\} \times \{p,a\}} E[|\beta_t|^2] \frac{\partial \Omega(\check{B}_t^p, \check{B}_t^a)}{\partial B_t^c} \quad \text{[Equation 29]}$$

The control node may increase the value of the quantization resource $\check{B}_{\hat{t}}^{\hat{c}}$ corresponding to the selected combined signal element $\hat{t}$ and the codebook type $\hat{c}$ by 1 (S627). In other words, among the elements constituting the quantization resource allocation scenario $\check{\mathcal{R}}_{\check{T}} = \{\check{B}_1^p, \check{B}_1^a, \ldots, \check{B}_{\check{T}}^p, \check{B}_{\check{T}}^a\}$ for the arbitrary $\check{T}$, a value of any one element or quantization resource selected through the step S625 may be increased by 1. Expressing this as an equation, it may be expressed as Equation 30.

$$\check{B}_{\hat{t}}^{\hat{c}} = (\check{B}_{\hat{t}}^{\hat{c}} + 1) \in \check{\mathcal{R}}_{\check{T}} \quad \text{[Equation 30]}$$

The control node may update the quantization resource allocation scenario $\check{\mathcal{R}}_{\check{T}}$ through the operations according to the steps S621 to S627. The control node may determine whether to terminate the iterative update operation according to the step S620 based on a result of comparison between the total amount $\check{B}$ of quantization resources used in the updated quantization resource allocation scenario $\check{\mathcal{R}}_{\check{T}}$ and the preset value B. For example, when the total amount $\check{B}$ of quantization resources used in the updated quantization resource allocation scenario $\check{\mathcal{R}}_{\check{T}}$ is less than the preset value B (i.e., $\check{B} = \sum_{t=1}^{\check{T}} (\check{B}_t^p + \check{B}_t^a) < B$), the control node may perform the operations according to the steps S621 to S627 again. On the other hand, when the total amount $\check{B}$ of quantization resources used in the updated quantization resource allocation scenario $\check{\mathcal{R}}_{\check{T}}$ becomes greater than or equal to the preset value B (i.e., $\breve{B}=\Sigma_{t=1}^{T}(\breve{B}_t^p+\breve{B}_t^a)\geq B$), the control node may terminate the iterative update operation according to the step S620 (S629).

The control node may update the optimal quantization resource allocation scenario $\mathcal{R}_{\tilde{T}}$ based on the result of the iterative update operation in the step S620 (S630). When the total amount $\breve{B}$ of quantization resources used in the updated quantization resource allocation scenario $\breve{\mathcal{R}}_{\tilde{T}}$ becomes greater than or equal to the preset value B through the iterative update operation according to the step S620, the control node may determine the updated quantization resource allocation scenario at that time as the optimal quantization resource allocation scenario $\breve{\mathcal{R}}_{\tilde{T}}$ (S631). Expressing this as an equation, it may be expressed as Equation 31.

$$\mathcal{R}_{\tilde{T}}=\breve{\mathcal{R}}_{\tilde{T}} \quad \text{[Equation 31]}$$

Through the operations of the quantization resource allocation algorithm shown in FIG. 6, the control node may determine the optimal quantization resource scenario $\mathcal{R}_{\tilde{T}}$ for $\tilde{T}$. The control node may determine the optimal quantization resource scenario $R_{\tilde{T}}$ for each of a plurality of possible $\tilde{T}$ values. The control node may evaluate a communication quality for each of the plurality of optimal quantization resource scenarios $\mathcal{R}_{\tilde{T}}$. For example, the control node may calculate a distributed communication quality indicator (QI) $\gamma(\mathcal{R}_{\tilde{T}})$ for each of the plurality of optimal quantization resource scenarios $\mathcal{R}_{\tilde{T}}$. In an exemplary embodiment of the communication system, the distributed communication quality indicator $\gamma(\rho_{\tilde{T}})$ may be defined as in Equation 32.

$$\gamma(\mathcal{R}_{\tilde{T}})=\frac{\rho PN\left(L+(K-1)\sum_{t=1}^{\tilde{T}}E[|\beta_t|^2]\right)}{N+(K-1)\left(\tilde{T}+\rho PNM\sum_{t=1}^{\tilde{T}}\Omega(B_t^p,B_t^a)E[|\beta_t|^2]\right)} \quad \text{[Equation 32]}$$

The control node may determine one optimal quantization resource scenario $\mathcal{R}_{\tilde{T}}$ that makes the distributed communication quality indicator ($\mathcal{R}_{\tilde{T}}$) the best as the final quantization resource scenario $\mathcal{R}_T$. In other words, the control node may select $\tilde{T}$ such that the value of the distributed communication QI $\gamma(\mathcal{R}_{\tilde{T}})$ is maximized from among a plurality of possible $\tilde{T}$ values. Expressing this as an equation, it may be expressed as Equation 33.

$$T=\underset{\tilde{T}}{\arg\max}\gamma(\mathcal{R}_{\tilde{T}}) \quad \text{[Equation 33]}$$

The control node may determine the final quantization resource scenario $\mathcal{R}_T$ based on T determined as in Equation 33. The control node may transmit the value of T determined as in Equation 33 and information of the final quantization resource scenario $\mathcal{R}_T$ to other communication nodes constituting the distributed communication system. For example, the control node corresponding to the MU of the distributed communication system may deliver the value of T and the information of the final quantization resource scenario $\mathcal{R}_T$ to the AUs of the distributed communication system. The AUs of the distributed communication system may receive the information of the value of T and the final quantization resource scenario $\mathcal{R}_T$ transmitted from the MU. Each of the AUs of the distributed communication system may obtain a combined quantized signal vector from the receptions signal based on the value of T and the information of the final quantization resource scenario $\mathcal{R}_T$ which are delivered from the MU. The MU may reconstruct the transmission signal based on the information on the value of T, information on the final quantization resource scenario $\mathcal{R}_T$, information on the quantized combined signal vectors transmitted from the AUs, and the like.

According to an exemplary embodiment of the present disclosure, a distributed communication system may be configured to include at least one main user (MU) and a plurality of assistant users (AUs). The MU and AUs of the distributed communication system may receive a wireless transmission signal transmitted by a transmitting node. Information of the signal received at each of the AUs of the distributed communication system may be delivered to the MU in form of compressed and quantized information. The MU may restore the transmission signal transmitted by the transmitting node based on information of the signal received by itself and the compressed and quantized information transmitted from each of the AUs. A control node of the distributed communication system may perform a quantization resource allocation operation for the distributed communication operations of the distributed communication system based on a quantization scheme. Through this, distributed communication performance of the distributed communication system can be remarkably improved.

However, the effects that can be achieved by the distributed communication method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first receiving node in a distributed communication system, the operation method comprising:

receiving a signal from a transmitting node;
extracting a combined signal vector from a reception signal vector corresponding to a vector of the received signal;
obtaining a compressed combined signal vector by extracting a preset number T of combined signal elements from among a plurality of combined signal elements constituting the combined signal vector;
quantizing the compressed combined signal vector to obtain a quantized combined signal vector; and
transmitting the quantized combined signal vector to a second receiving node included in the distributed communication system,
wherein T is a natural number, the first receiving node corresponds to one of a plurality of assistant users (AUs) included in the distributed communication system, and the second receiving node corresponds to a main user (MU) decoding a transmission signal of the transmitting node based on quantized combined signal vectors transmitted from the plurality of AUs.

2. The operation method according to claim 1, wherein the obtaining of the quantized combined signal vector comprises:
performing a quantization operation on an amplitude of each of the T combined signal elements constituting the compressed combined signal vector to obtain quantized amplitude information for each of the T combined signal elements;
performing a quantization operation on a phase of each of the T combined signal elements constituting the compressed combined signal vector to obtain quantized phase information for each of the T combined signal elements; and
obtaining the quantized combined signal vector based on the quantized amplitude information and the quantized phase information obtained for each of the T combined signal elements.

3. The operation method according to claim 2, wherein the obtaining of the quantized amplitude information comprises:
determining an amplitude of a t-th combined signal element among the T combined signal elements;
identifying an element having a smallest difference from the amplitude of the t-th combined signal element among elements constituting an amplitude codebook having a preset size of $B_t^a$ bits; and
determining the element having the smallest difference from the amplitude of the t-th combined signal element as the quantized amplitude information for the t-th combined signal element,
wherein t is a natural number equal to or greater than 1 and equal to or less than T.

4. The operation method according to claim 2, wherein the obtaining of the quantized phase information comprises:
determining a phase of a t-th combined signal element among the T combined signal elements;
identifying an element having a smallest difference from the phase of the t-th combined signal element among elements constituting a phase codebook having a preset size of $B_t^p$ bits; and
determining the element having the smallest difference from the phase of the t-th combined signal element as the quantized phase information for the t-th combined signal element,
wherein t is a natural number equal to or greater than 1 and equal to or less than T, and the phase codebook is composed of $2^{B_t^p}$ elements that equally divide a section equal to or greater than 0 and less than $2\pi$.

5. The operation method according to claim 1, wherein the transmitting comprises transmitting the quantized combined signal vector to the second receiving node through a data transmission/reception link formed between the first receiving node and the second receiving node, and a capacity of the data transmission/reception link is determined based on a sum of a size of each of T amplitude codebooks used for a quantization operation on an amplitude of each of the extracted T combined signal elements, and a size of each of T amplitude codebooks used for a quantization operation on a phase of each of the extracted T combined signal elements.

6. The operation method according to claim 1, further comprising, before the receiving of the signal, obtaining, from the second receiving node, information on the preset number T determined based on a quantization resource allocation operation, a size of each of T amplitude codebooks used for a quantization operation on an amplitude of each of the extracted T combined signal elements, and a size of each of T phase codebooks used for a quantization operation on a phase of each of the extracted T combined signal elements.

7. An operation method of a first receiving node included in a distributed communication system, the operation method comprising:
receiving a signal from a transmitting node;
receiving, from each of second to K-th receiving nodes included in the distributed communication system, a quantized combined signal vector obtained based on a reception signal vector corresponding to a vector of a signal received by each of the second to K-th receiving nodes;
calculating a compressed reception signal vector for each of the second to K-th receiving nodes based on the quantized combined signal vector received from each of the second to K-th receiving nodes;
calculating a virtual channel matrix corresponding to channel matrices between all of the first to K-th receiving nodes and the transmitting node;
calculating a virtual reception signal vector corresponding to reception signal vectors of all of the first to K-th receiving nodes based on a vector of the signal received by the first receiving node and the compressed reception signal vector for each of the second to K-th receiving nodes;
calculating a relational expression between the virtual reception signal vector and a vector of a transmission signal generated by the transmitting node based on the virtual reception signal vector and the virtual channel matrix; and
performing a decoding operation on the transmission signal based on the calculated relational expression,
wherein K is a natural number greater than 2, the first receiving node corresponds to a main user (MU) and the second to K-th receiving nodes correspond to a plurality of assistant users (AUs).

8. The operation method according to claim 7, wherein the performing of the decoding operation comprises:
calculating a covariance matrix for a quantization error plus noise (QEN) vector term included in the relational expression; and
calculating a predicted value for the transmission signal based on the virtual reception signal vector, the virtual channel matrix, and the calculated covariance matrix.

9. The operation method according to claim 7, further comprising, before the receiving of the signal, allocating quantization resources used for a quantization operation for obtaining the quantized combined signal vector based on the reception signal vector at each of the second to K-th receiving nodes, and the allocating of the quantization resources comprises:
initializing a quantization resource allocation scenarios having sizes of amplitude codebooks and phase codebooks used for the quantization operation as elements, for each of arbitrary $\check{T}$ values, which corresponds to a number T of combined signal elements extracted to obtain a compressed combined signal vector from a combined signal vector corresponding to the reception signal vector at each of the second to K-th receiving nodes;
performing iteratively updating the initialized quantization resource allocation scenario;
obtaining a final quantization resource allocation scenario based on a result of the iterative updating; and
transmitting quantization resource information corresponding to the final quantization resource allocation scenario to the second to K-th receiving nodes,
wherein the quantization resource information includes information on a size of each of T amplitude codebooks used for a quantization operation on an amplitude of each of the T combined signal elements, and a size of each of T phase codebooks used for a quantization operation on a phase of each of the T combined signal elements.

10. The operation method according to claim 9, wherein the obtaining of the final quantization resource allocation scenario comprises:
identifying an optimal quantization resource allocation scenario for each of the arbitrary $\check{T}$ values obtained as the result of the iterative updating;
calculating a distributed communication quality indicator for the optimal quantization resource allocation scenario for each of the arbitrary $\check{T}$ values;
selecting one $\check{T}$ value that best improves the distributed communication quality indicator among the arbitrary $\check{T}$ values;
determining the selected $\check{T}$ value as the number T of combined signal elements; and
determining the optimal quantization resource allocation scenario corresponding to the determined number T of combined signal elements as the final quantization resource allocation scenario.

11. A first receiving node included in a distributed communication system, the first receiving node comprising:
a processor;
a memory electronically communicating with the processor; and
instructions stored in the memory,
wherein when executed by the processor, the instructions cause the first receiving node to:
receive a signal from a transmitting node;
extract a combined signal vector from a reception signal vector corresponding to a vector of the received signal;
obtain a compressed combined signal vector by extracting a preset number T of combined signal elements from among a plurality of combined signal elements constituting the combined signal vector;
quantize the compressed combined signal vector to obtain a quantized combined signal vector; and
transmit the quantized combined signal vector to a second receiving node included in the distributed communication system,
wherein T is a natural number, the first receiving node corresponds to one of a plurality of assistant users (AUs) included in the distributed communication system, and the second receiving node corresponds to a main user (MU) decoding a transmission signal of the transmitting node based on quantized combined signal vectors transmitted from the plurality of AUs.

12. The first receiving node according to claim 11, wherein the instructions further cause the first receiving node to:
perform a quantization operation on an amplitude of each of the T combined signal elements constituting the compressed combined signal vector to obtain quantized amplitude information for each of the T combined signal elements;
perform a quantization operation on a phase of each of the T combined signal elements constituting the compressed combined signal vector to obtain quantized phase information for each of the T combined signal elements; and
obtain the quantized combined signal vector based on the quantized amplitude information and the quantized phase information obtained for each of the T combined signal elements.

13. The first receiving node according to claim 12, wherein the instructions further cause the first receiving node to:
identify an amplitude and a phase of a t-th combined signal element among the T combined signal elements;
identify an element having a smallest difference from the amplitude of the t-th combined signal element among elements constituting an amplitude codebook having a preset size of $B_t^a$ bits;
determine the element having the smallest difference from the amplitude of the t-th combined signal element as the quantized amplitude information for the t-th combined signal element;
identify an element having a smallest difference from the phase of the t-th combined signal element among elements constituting a phase codebook having a preset size of $B_t^p$ bits; and
determine the element having the smallest difference from the phase of the t-th combined signal element as the quantized phase information for the t-th combined signal element,
wherein t is a natural number equal to or greater than 1 and equal to or less than T, and the phase codebook is composed of $2^{B_t^p}$ elements that equally divide a section equal to or greater than 0 and less than $2\pi$.

14. The first receiving node according to claim 11, wherein the instructions further cause the first receiving node to transmit the quantized combined signal vector to the second receiving node through a data transmission/reception link formed between the first receiving node and the second receiving node, and a capacity of the data transmission/reception link is determined based on a sum of a size of each of T amplitude codebooks used for a quantization operation on an amplitude of each of the extracted T combined signal elements, and a size of each of T amplitude codebooks used for a quantization operation on a phase of each of the extracted T combined signal elements.

15. The first receiving node according to claim 11, wherein the instructions further cause the first receiving node to, before the receiving of the signal, obtain, from the second receiving node, information on the preset number T determined based on a quantization resource allocation operation, a size of each of T amplitude codebooks used for a quantization operation on an amplitude of each of the extracted T combined signal elements, and a size of each of T phase codebooks used for a quantization operation on a phase of each of the extracted T combined signal elements.

* * * * *